US012700555B2

(12) United States Patent
Ho

(10) Patent No.: US 12,700,555 B2
(45) Date of Patent: Aug. 4, 2026

(54) BALANCED LOW TRAVEL KEY SWITCH DEVICE

(71) Applicant: SUNREX TECHNOLOGY CORP., Taichung City (TW)

(72) Inventor: Shi-Yew Ho, Taichung City (TW)

(73) Assignee: SUNREX TECHNOLOGY CORP., Taichung City (TW)

( * ) Notice: Subject to any disclaimer, the term of this patent is extended or adjusted under 35 U.S.C. 154(b) by 528 days.

(21) Appl. No.: 18/356,345

(22) Filed: Jul. 21, 2023

(65) Prior Publication Data

US 2024/0347292 A1 Oct. 17, 2024

(51) Int. Cl.

| | |
|---|---|
| ***H01H 13/7073*** | (2006.01) |
| ***H01H 13/18*** | (2006.01) |
| ***H01H 13/52*** | (2006.01) |

(52) U.S. Cl.

CPC ...... *H01H 13/7073* (2013.01); *H01H 13/186* (2013.01); *H01H 13/52* (2013.01)

(58) Field of Classification Search

CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS 10,509,482 B1 * 12/2019 Tsai ...................... G06F 3/0202

FOREIGN PATENT DOCUMENTS

TW M594794 5/2020

* cited by examiner

*Primary Examiner* — Ahmed M Saeed
(74) *Attorney, Agent, or Firm* — Burris Law, PLLC

(57) ABSTRACT

A balanced low travel key switch device includes limiting recesses, first sliding recesses, and second sliding recesses mounted on a plate body. A first frame member has a first main body connected to a key cap, first lateral portions connected to the first main body, first pivotal portions connected to the first lateral portions, engaging blocks movable in the first sliding recesses, and positioning rods movable in the limiting recesses. A second frame member has a second main body pivotally connected to the key cap, second lateral portions connected to the second main body, second pivotal portions connected to the second lateral portions and the first pivotal portions, second engaging blocks disposed on the second lateral portions and movable in the second sliding recesses.

19 Claims, 11 Drawing Sheets

BALANCED LOW TRAVEL KEY SWITCH DEVICE

CROSS-REFERENCE TO RELATED APPLICATION

This application claims priority to Taiwanese Utility Model Patent Application No. 112203531, filed on Apr. 17, 2023.

FIELD

The disclosure relates to a key switch device, and more particularly to a balanced low travel key switch device

BACKGROUND

Referring to FIGS. 10 and 11, a key switch device, as disclosed in Taiwanese Utility Model Patent No. TWM594794U, includes a base 1, a key cap (not shown) disposed above the base 1, and a press balance unit 3 disposed between the base 1 and the key cap. The press balance unit 3 includes a first balance frame 31 connected between the base 1 and the key cap, a second balance frame 32 connected between the base 1 and the key cap, and an extension spring 33 connected between the first balance frame 31 and the second balance frame 32.

The base 1 includes a base plate 10 and two mounting arms 11 that respectively extend from two opposite sides of the base plate 10. Each of the mounting arms 11 has two insertion holes.

The first balance frame 31 has a first transverse bar 311, two spaced-apart first longitudinal bars 312 connected to the first transverse bars 311, and two first insertion blocks 3121 respectively protruding from the first longitudinal bars 312. The second balance frame 32 has a second transverse bar 321, two spaced-apart second longitudinal bars 322 connected to the second transverse bar 321, and two second insertion blocks 3221 respectively protruding from the second longitudinal bars 322. Each of the first insertion blocks 3121 and each of the second insertion blocks 3221 are respectively and rotatably inserted into the insertion holes of a respective one of the mounting arms 11.

When the key cap is pressed, the first balance frame 31 and the second balance frame 32 swing upward and downward to balance such a pressing action. However, movement of one of the first balance frame 31 and the second balance frame 32 cannot drive movement of the other one of the first balance frame 31 and the second balance frame 32. As a corner of the key cap is pressed, the first balance frame 31 and the second balance frame 32 are moved unevenly, thereby resulting in unsmooth pressing, poor operational stability, and long travel of the key cap.

SUMMARY

Therefore, an object of the disclosure is to provide a balanced low travel key switch device that can alleviate at least one of the drawbacks of the prior art.

According to the disclosure, the balanced low travel key switch device includes a base plate, a key cap, and a frame unit.

The base plate includes a plate body and two mounting seats. The two mounting seats are mounted on the plate body and are spaced apart from each other along a first axial direction. Each of the mounting seats has a limiting recess, a first sliding recess, and a second sliding recess that are arranged along a second axial direction perpendicular to the first axial direction. The first sliding recess and the second sliding recess are respectively disposed on two opposite sides of the limiting recess.

The key cap is disposed at a side of the base plate along a third axial direction that is perpendicular to the first axial direction and the second axial direction.

The frame unit removably interconnects the mounting seats and the key cap, and includes a first frame member and a second frame member that are arranged along the second axial direction.

The first frame member has a first main body, two first lateral portions, two first pivotal portions, two first engaging blocks, and two positioning rods. The first main body is pivotally connected to the key cap. The first lateral portions are spaced apart from each other along the first axial direction and are respectively connected to opposite ends of the first main body. The first pivotal portions are respectively connected to distal ends of the first lateral portions. The first engaging blocks are respectively disposed on the first lateral portions, respectively extend into the first sliding recesses of the mounting seats, and are respectively movable in the first sliding recesses of the mounting seats along the second axial direction. The positioning rods are respectively disposed on the first pivotal portions, respectively extend into the limiting recesses of the mounting seats, and are respectively movable in the limiting recesses of the mounting seats along the third axial direction.

The second frame member has a second main body, two second lateral portions, two second pivotal portions, and two second engaging blocks. The second main body is pivotally connected to the key cap. The second lateral portions are spaced apart from each other along the first axial direction and are respectively connected to opposite ends of the second main body. The second pivotal portions are respectively connected to distal ends of the second lateral portions and are respectively and pivotally connected to the first pivotal portions. The second engaging blocks are respectively disposed on the second lateral portions, respectively extend into the second sliding recesses of the mounting seats, and are respectively movable in the second sliding recesses of the mounting seats along the second axial direction.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
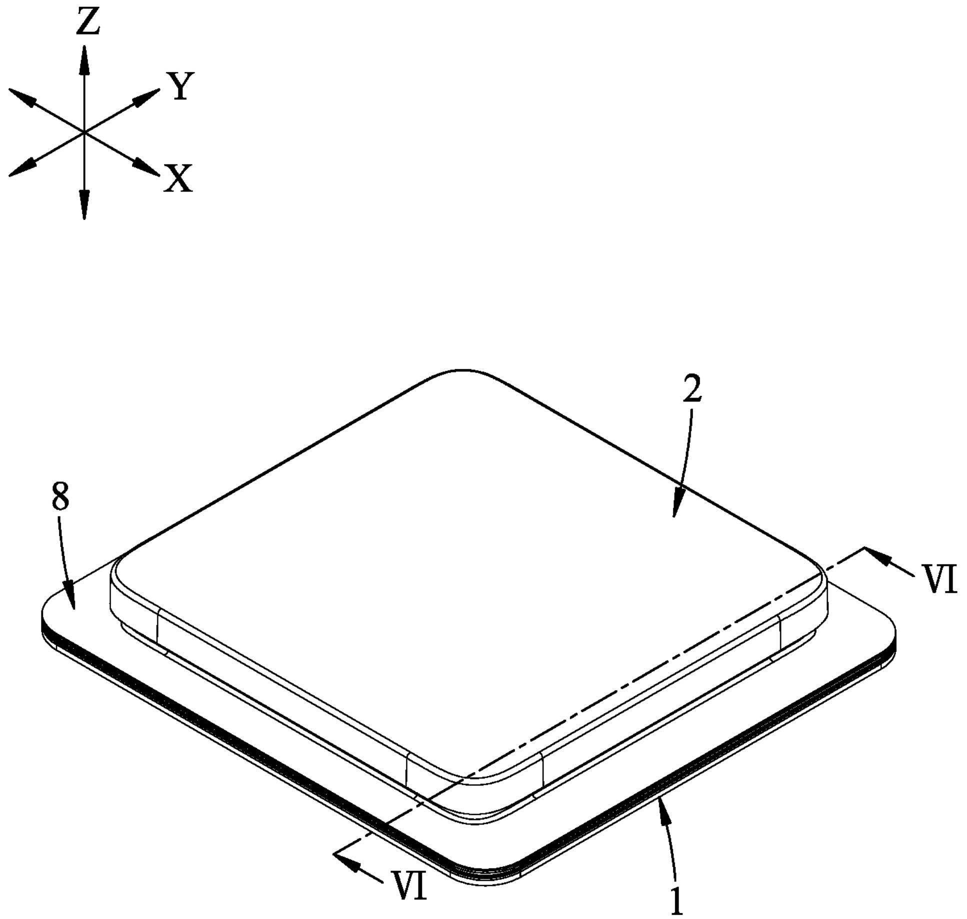
FIG. 1 is a perspective view illustrating a balanced low travel key switch device according to a first embodiment of the disclosure in an assembled state.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
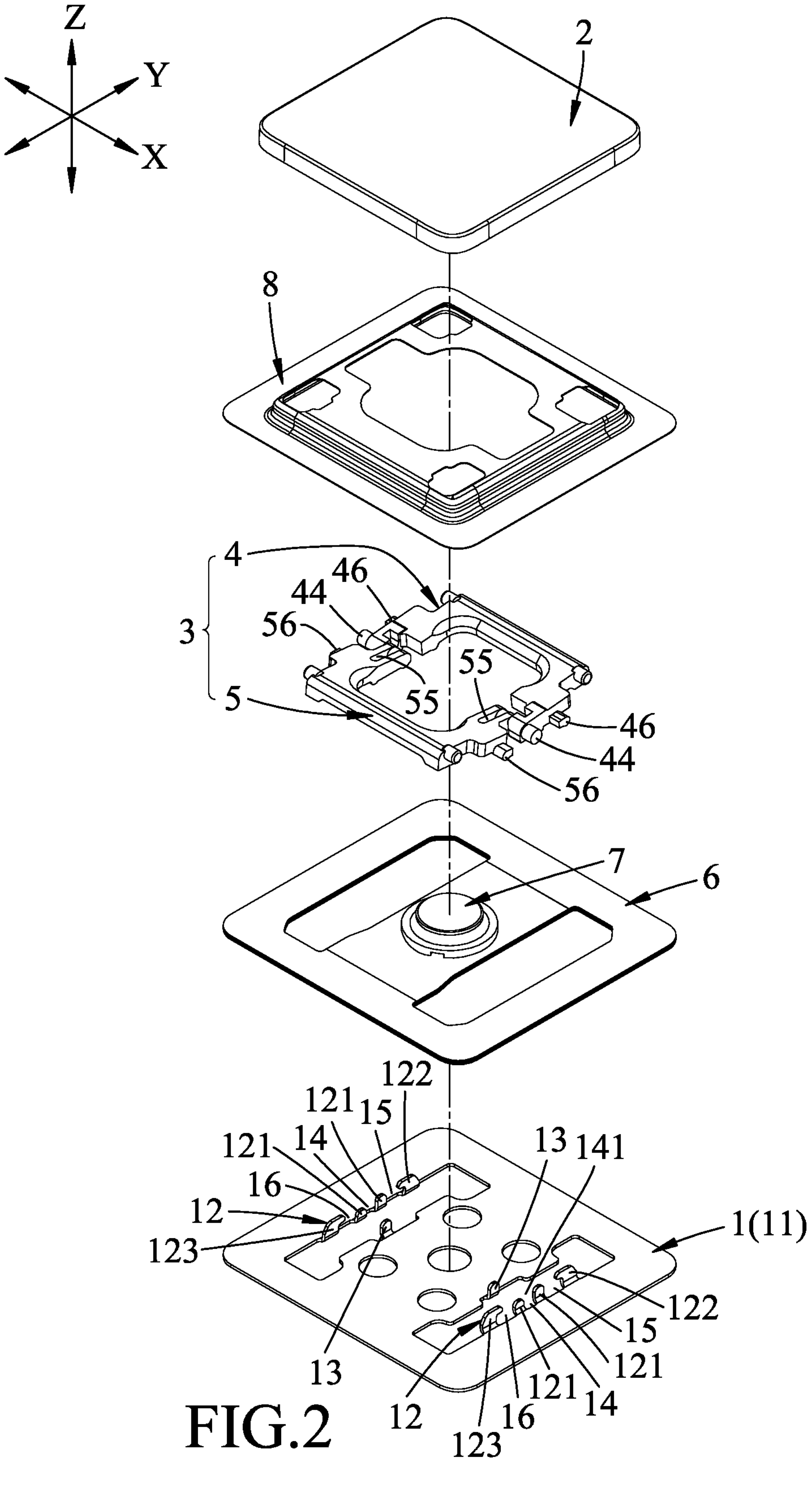
FIG. 2 is an exploded perspective view of the first embodiment.

FIGS. 1 and 2 illustrate a balanced low travel key switch device according to a first embodiment of the disclosure. The balanced low travel key switch device includes a base plate 1, a key cap 2, a frame unit 3, a membrane circuit board 6, a resilient member 7, and a key frame 8.

The base plate 1 includes a plate body 11, two mounting seats 12 that are mounted on the plate body 11 and that are spaced apart from each other along a first axial direction (X), and two stop members 13 that extend from the plate body 11 and that are disposed between the mounting seats 12.

Each of the mounting seats 12 has two constraining portions 121, a first hook portion 122, and a second hook portion 123.

The constraining portions 121 of each of the mounting seats 12 are connected to the plate body 11, are spaced apart from each other along a second axial direction (Y) that is perpendicular to the first axial direction (X), and cooperatively define a limiting recess 14. The limiting recess 14 of each of the mounting seats 12 has an opening 141 that is opposite to the plate body 11 along a third axial direction (Z) which is perpendicular to the first axial direction (X) and the second axial direction (Y).

For each of the mounting seats 12, the first hook portion 122 and the second hook portion 123 are spaced apart from each other along the second axial direction (Y), and are respectively disposed at opposite sides of the constraining portions 121. The first hook portion 122 and an adjacent one of the constraining portions 121 cooperatively define a first sliding recess 15. The second hook portion 123 and an adjacent one of the constraining portions 121 cooperatively define a second sliding recess 16. The limiting recess 14, the first sliding recess 15, and a second sliding recess 16 of each of the mounting seats 12 are arranged along the second axial direction (Y); the first sliding recess 15 and the second sliding recess 16 are respectively disposed on two opposite sides of the limiting recess 14 along the second axial direction (Y). In this embodiment, the constraining portions 121 of one of the mounting seats 12 are respectively spaced apart from the constraining portions 121 of another of the mounting seats 12 along the first axial direction (X). The first sliding recess 15 and the second sliding recess 16 of one of the mounting seats 12 are respectively spaced apart from the first sliding recess 15 and the second sliding recess 16 of another of the mounting seats 12. As a result, the first sliding recesses 15 of the mounting seats 12 are spaced apart from each other along the first axial direction (X), and the second sliding recesses 16 of the mounting seats 12 are spaced apart from each other along the first axial direction (X).

The key cap 2 is disposed at a side of the base plate 1 along the third axial direction (Z). The frame unit 3 is disposed between the key cap 2 and the base plate 1. The membrane circuit board 6 is disposed between the key cap 2 and the base plate 1. The resilient member 7 is disposed on the membrane circuit board 6 opposite to the base plate 1, and resiliently abuts against the key cap 2. The key frame 8 engages the key cap 2 and covers the frame unit 3.

Figure 3:
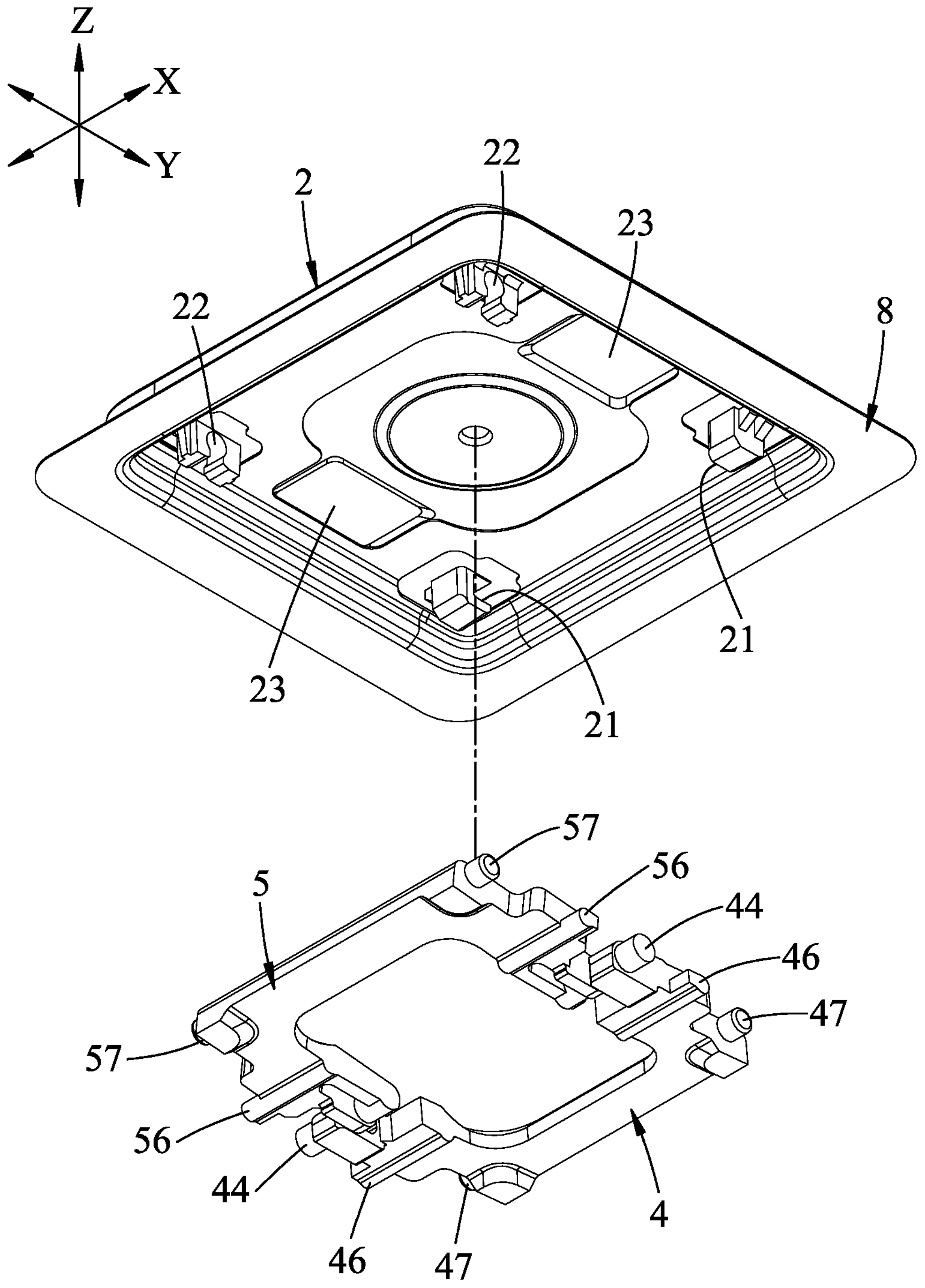
FIG. 3 is an exploded perspective view of the first embodiment illustrating a key cap, a key frame, a first frame member, and a second frame member of the balanced low travel key switch device.
Figure 4:
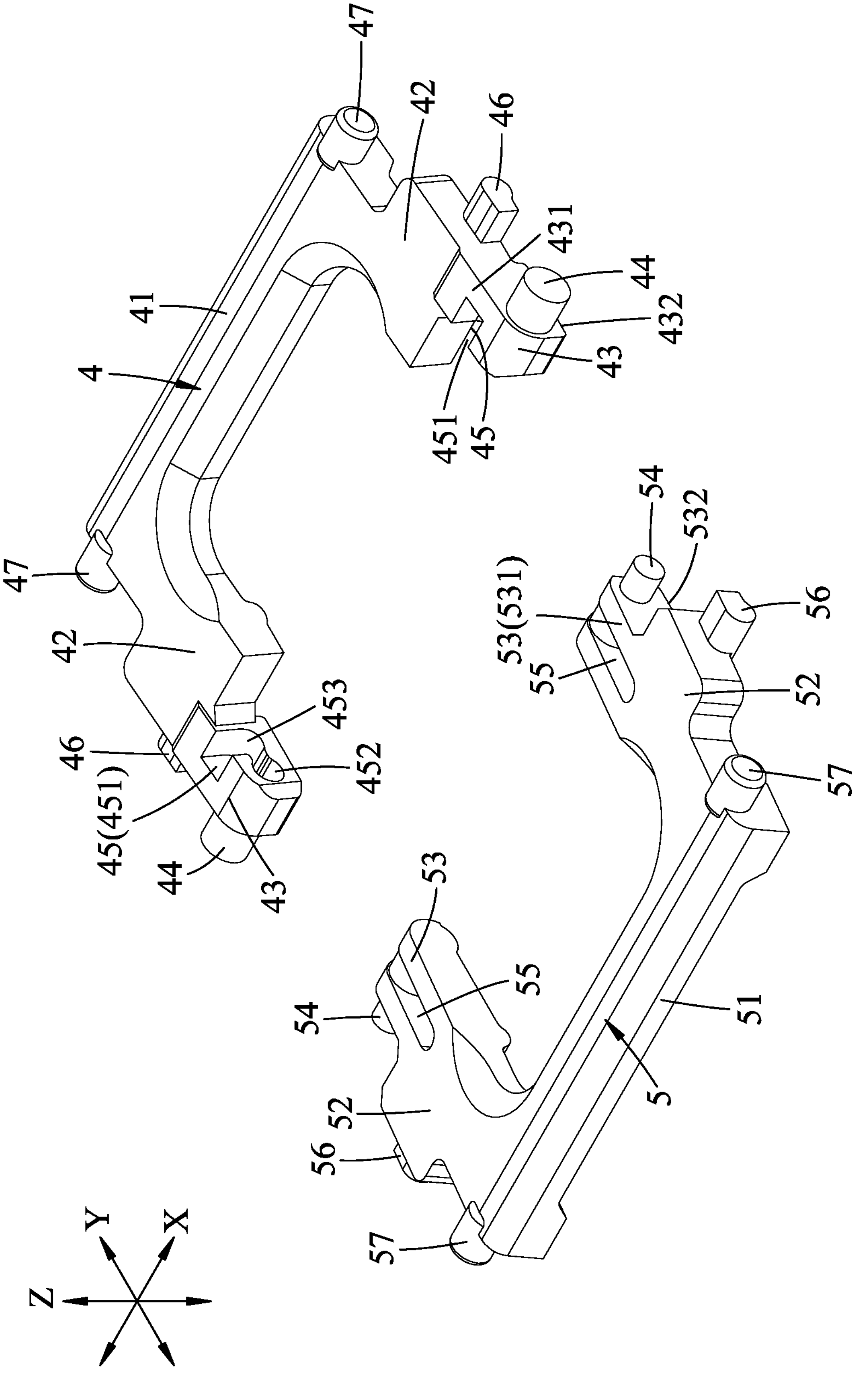
FIG. 4 is an exploded perspective view of the first embodiment illustrating the first frame member and a second frame member in a disassembled state.
Figure 5:
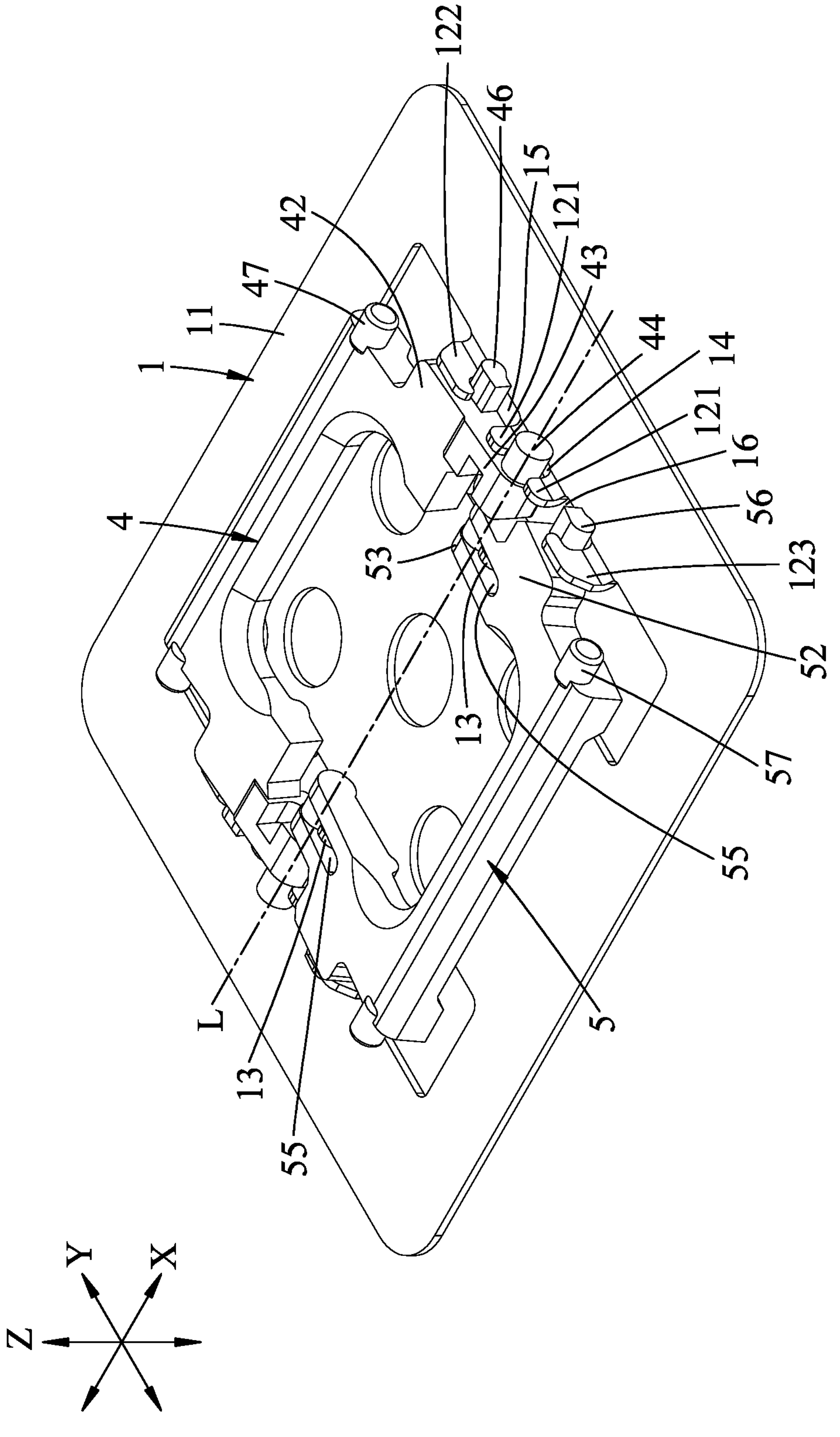
FIG. 5 is a perspective view of the first embodiment illustrating the first frame member, the second frame member, and a base plate in an assembled state.

Referring to FIGS. 3 to 5, the key cap 2 includes two first fastening grooves 21 that are spaced apart from each other along the first axial direction (X), two second fastening grooves 22 that are spaced apart from each other along the first axial direction (X), and two indentations 23 each of which is disposed along the second axial direction (Y) between a respective one of first fastening grooves 21 and a respective one of the second fastening grooves 22.

The frame unit 3 removably interconnects the mounting seats 12 and the key cap 2, and includes a first frame member 4 and a second frame member 5 that are arranged along the second axial direction (Y).

The first frame member 4 is formed as a U shape, and has a first main body 41, two first lateral portions 42, two first pivotal portions 43, two positioning rods 44, two pivot slots 45, two first engaging blocks 46, and two first engaging rods 47.

The first lateral portions 42 are spaced apart from each other along the first axial direction X and are respectively connected to opposite ends of the first main body 41.

The first pivotal portions 43 are respectively connected to distal ends of the first lateral portions 42. Each of the first pivot portions 43 has a top surface 431 that faces the key cap 2, and a bottom surface 432 that is opposite to the top surface 431.

The positioning rods 44 are respectively disposed on the first pivotal portions 43, respectively extend into the limiting recesses 14 of the mounting seats 12, and are respectively movable in the limiting recesses 14 of the mounting seats 12 along the third axial direction (Z). The positioning rods 44 are removable from the limiting recesses 14 of the mounting seats 12 through the openings 141 of the mounting seats 12.

The pivot slots 45 are respectively formed in the first pivotal portions 43. Each of the pivot slots 45 is disposed opposite to a respective one of the positioning rods 44, and has an open end portion 451, a first slot portion 452, and a second slot portion 453. The second slot portion 453 is bent from the open end portion 451. The first slot portion 452 extends from and is smaller than the second slot portion 453, and is opposite to the open end portion 451. In this embodiment, the open end portion 451 of each of the pivot slots 45 is formed in the top surface 431 of a respective one of the first pivot portions 43. The first slot portion 452 of each of the pivot slots 45 is disposed more distantly from a respective one of the first lateral portions 42 that is connected to the respective one of the first pivotal portions 43 than the second slot portion 453 of the pivot slot 45. The first slot portion 452 and the second slot portion 453 cooperatively form a gourd-shaped cross section on a plane that is formed by the third axial direction (Z) and the second axial direction (Y).

The first engaging blocks 46 are respectively disposed on the first lateral portions 42, respectively extend into the first sliding recesses 15 of the mounting seats 12, and are respectively movable in the first sliding recesses 15 of the mounting seats 12 along the second axial direction (Y).

The first engaging rods 47 are respectively disposed on two opposite sides of the first main body 41 along the first axial direction (X) and are pivotally engaged with the first fastening grooves 21 of the key cap 2. Each of the first engaging rods 47 is disposed on an end of the first main body 41 that is opposite to the base plate 1 along the third axial direction (Z). The first main body 41 is pivotally connected to the key cap 2 by the first engaging rods 47.

The second frame member 5 is formed as a U shape, and has a second main body 51, two second lateral portions 52, two second pivotal portions 53, two pivot rods 54, two channels 55, two second engaging blocks 56, and two second engaging rods 57.

The second lateral portions 52 are spaced apart from each other along the first axial direction X and are respectively connected to opposite ends of the second main body 51.

The second pivotal portions 53 are respectively connected to distal ends of the second lateral portions 52, and are respectively and pivotally connected to the first pivotal portions 43. The second pivotal portions 53 of the second frame member 5 are disposed between the first pivot portions 43 of the first frame member 4. Each of the second pivotal portions 53 of the second frame member 5 has a top surface 531 that faces the key cap 2, and a bottom surface 532 that is opposite to the top surface 531. Each of the channels 55 extends through the top surface 531 and the bottom surface 532 of a respective one of the second pivotal portions 53. The stop members 13 respectively extend into the channels 55 of the second frame member 5.

The pivot rods 54 are respectively disposed on the second pivot portions 53. Each of the pivot rods 54 is removably engaged with the first slot portion 452 of a respective one of the pivot slots 45 by passing sequentially through the open end portion 451 and the second slot portion 453 of the pivot slot 45. The first pivot portions 43 of the first frame member 4 and the second pivotal portions 53 of the second frame member 5 are stably pivotable about an axial line (L) that passes through the positioning rods 44 of the first frame member 4 and the pivot rods 54 of the second frame member 5, and that extends along the first axial direction (X).

The second engaging blocks 56 are respectively disposed on the second lateral portions 52, respectively extend into the second sliding recesses 16 of the mounting seats 12, and are respectively movable in the second sliding recesses 16 of the mounting seats 12 along the second axial direction (Y).

The second engaging rods 57 are respectively disposed on two opposite sides of the second main body 51 along the first axial direction (X) and are pivotally connected to the second fastening grooves 22 of the key cap 2. In this embodiment, each of the second engaging rods 57 is disposed on an end of the second main body 51 that is opposite to the base plate 1 along the third axial direction (Z). The second main body 51 is pivotally connected to the key cap 2 by the second engaging rods 57.

Figure 6:
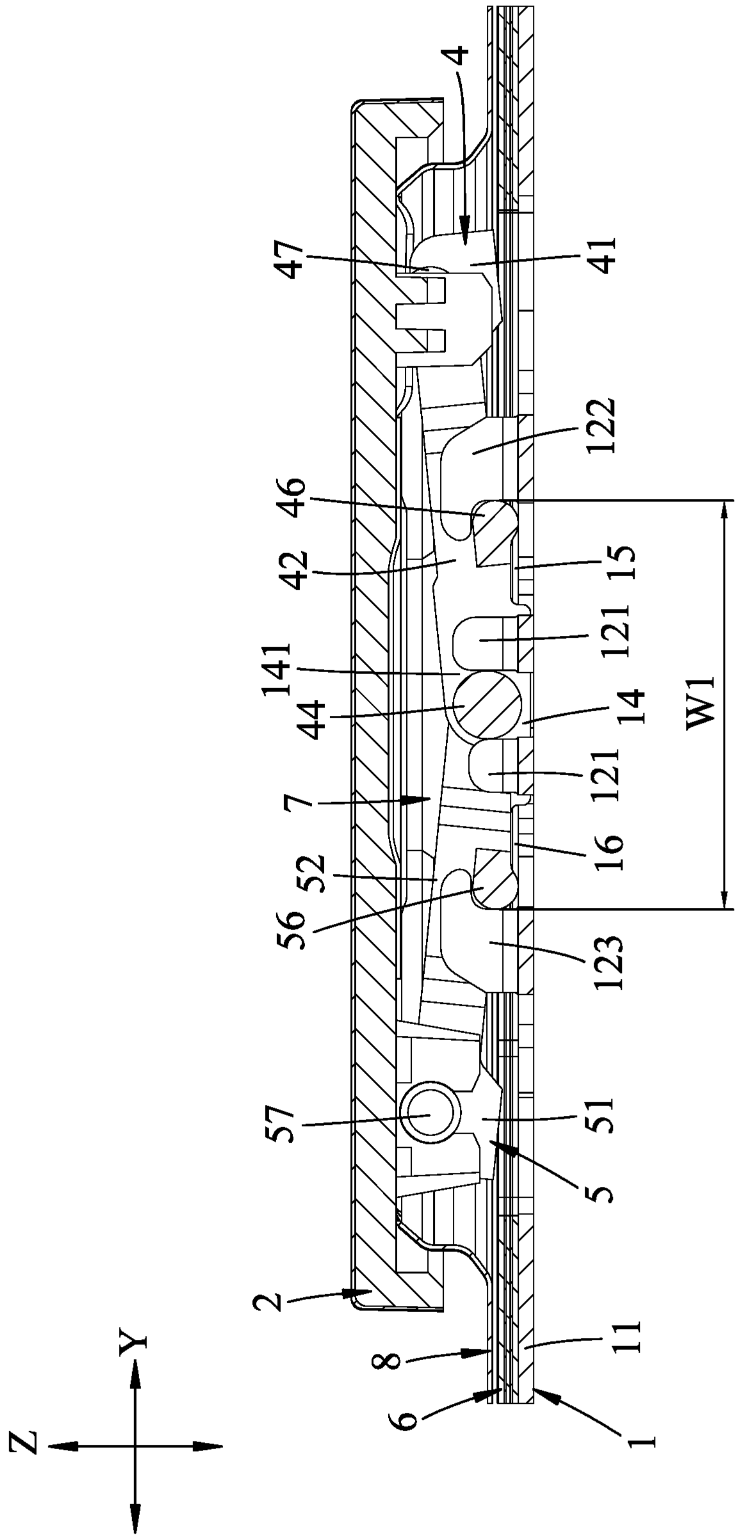
FIG. 6 is a schematic sectional view taken along line VI-VI from FIG. 1 illustrating the key cap in a non-pressed position relative to the base plate.
Figure 7:
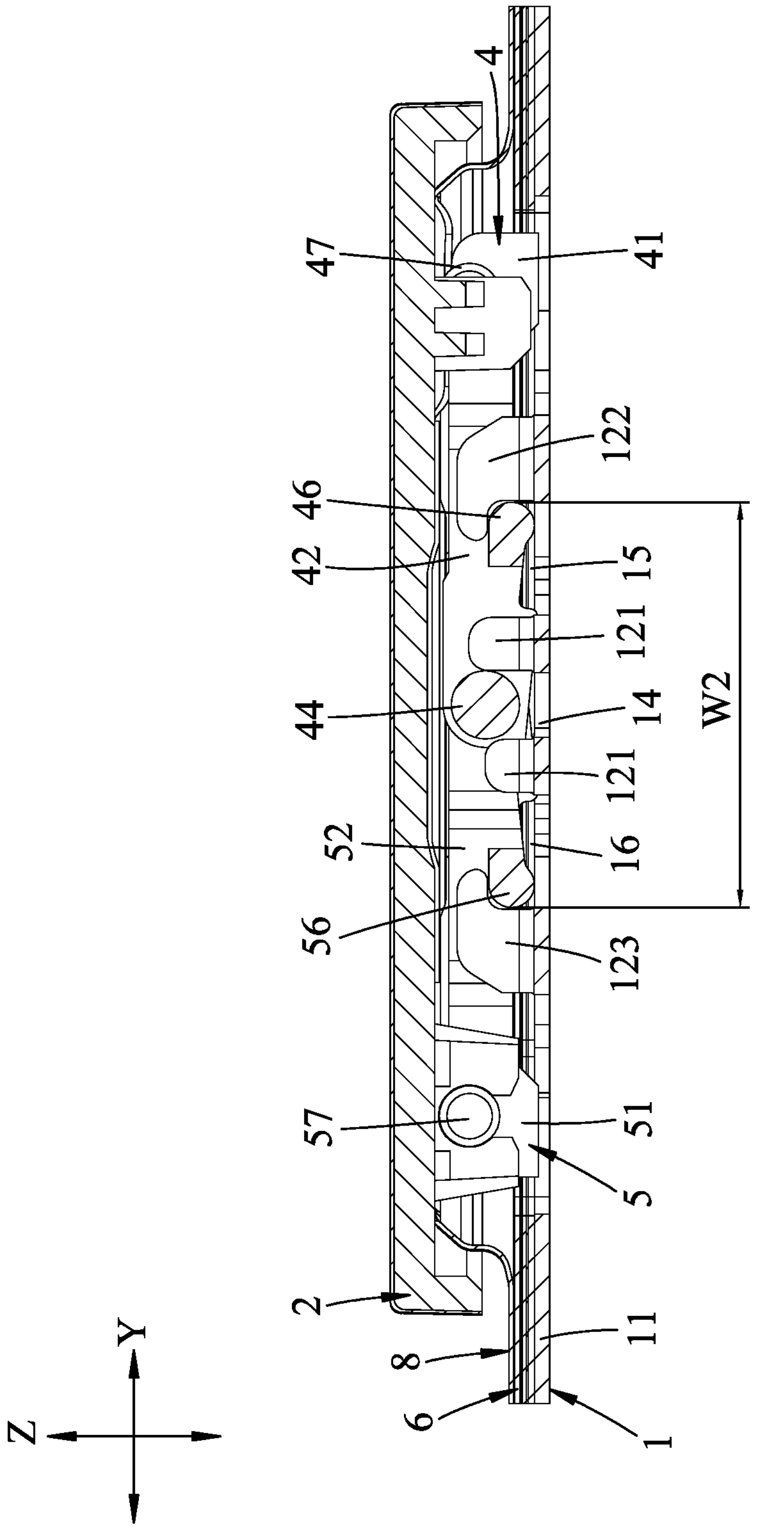
FIG. 7 is a view similar to FIG. 6, but illustrating the key cap in a pressed position relative to the base plate.

Referring to FIGS. 6 and 7, during movement of the key cap 2 relative to the base plate 1 from a non-pressed position to a pressed position, the key cap 2 is moved toward the plate body 1 and compresses the resilient member 7, and each of the positioning rods 44 is moved along the third axial direction (Z) toward the key cap 2. As a result, the first main body 41 and the second main body 51 are driven to pivotally rotate to each other and to move together toward the plate body 11. A first distance (W1) along the second axial direction (Y) between an end of each of the first engaging blocks 46 that is opposite to an adjacent one of the positioning rods 44 and an end of a respective one of the second engaging blocks 56 that is opposite to the positioning rod 44 when the key cap 2 is in the non-pressed position is greater than a second distance (W2) along the second axial direction (Y) between the end of the first engaging block 46 and the end of the second engaging block 56 when the key cap 2 is in the pressed position.

As shown in FIG. 6, when the key cap 2 is in the non-pressed position relative to the base plate 1, each of the first engaging blocks 46 abuts against the first hook portion 122 of the respective one of the mounting seats 12, and the second engaging blocks 56 abuts against the second hook portion 123 of the respective one of the mounting seats 12. Each of the positioning rods 44 is disposed adjacent to the plate body 11 along the third axial direction (Z) when the key cap 2 is in the non-pressed position.

As shown in FIG. 7, when the key cap 2 is in the pressed position, the key cap 2 is disposed adjacent to the plate body 11 along the third axial direction (Z), the first engaging block 46 is spaced apart from the first hook portion 122 along the second axial direction (Y) while being limited by the first hook portion 122 along the third axial direction (Z), and the second engaging block 56 is spaced apart from the second hook portion 123 along the second axial direction (Y) while being limited by the second hook portion 123 along the third axial direction (Z).

When the key cap 2 is not pressed, the resilient member 7 urges the key cap 2 from the pressed position to the non-pressed position. During the movement of the key cap 2 from the pressed position to the non-pressed position, the first main body 41 and the second main body 51 are driven to move along the third axial direction (Z) away from the plate body 11, the first engaging block 46 and the second engaging block 56 are driven to move along the second axial direction (Y) respectively toward the first hook portion 122 and the second hook portion 123.

In this embodiment, because the first hook portion 122 limits movement of the first engaging block 46 along the third axial direction (Z), the first engaging block 46 may move in the first sliding recess 15 along the second axial direction (Y), but not in the first sliding recess 15 along the third axial direction (Z). Because the second hook portion 13 limits movement of the second engaging block 56 along the third axial direction (Z), the second engaging block 56 may move in the second sliding recess 16 along the second axial direction (Y), but not in the second sliding recess 16 along the third axial direction (Z). Because the constraining portions 121 limit movement of the positioning rod 44 along the second axial direction (Y), the positioning rod 44 may move along the third axial direction (Z) in the limiting recess 14, but not in the limiting recess 14 along the second axial direction (Y). Therefore, when the key cap 2 is moved between the pressed position and the non-pressed position relative to the base plate 1, the first frame member 4, the second frame member 5, and the base plate 1 at junction are inseparable, and the first frame member 4 and the second frame member 5 may effectively drive each other.

Because the first engaging rods 47 of the first frame member 4 are respectively and pivotally engaged with the first fastening grooves 21 of the key cap 2, and because the second engaging rods 57 of the second frame member 5 are respectively and pivotally connected to the second fastening grooves 22 of the key cap 2, when a corner of the key cap 2 is pressed, the keycap 2 may be kept evenly and stably in a horizontal manner to move toward the base plate 1.

Along the third axial direction (Z), the first engaging rods 47 of the first frame member 4 are distant from the base plate 1 than the first engaging blocks 46, and the second engaging rods 57 of the second frame member 5 are distant from the base plate 1 than the second engaging blocks 56. When the key cap 2 is pressed to move toward the base plate 1, the first main body 41 and the second main body 51 are driven to pivotally rotate to each other and to move together toward the plate body 11, thereby driving the first engaging blocks 46 and the second engaging blocks 56 to move along the second axial direction (Y) in the first sliding recesses 15 and the second sliding recesses 16 of the mounting seats 12.

Because the stop members 13 respectively extend into the channels 55 of the second frame member 5, movement of the second pivotal portions 53 of the second frame 5 is limited. When the key cap 2 is pressed, because movement of the second pivotal portions 53 is limited by the stop members 13, horizontal swaying of the frame unit 3 is reduced, thereby increasing operational stability of the frame unit 3.

Figure 8:
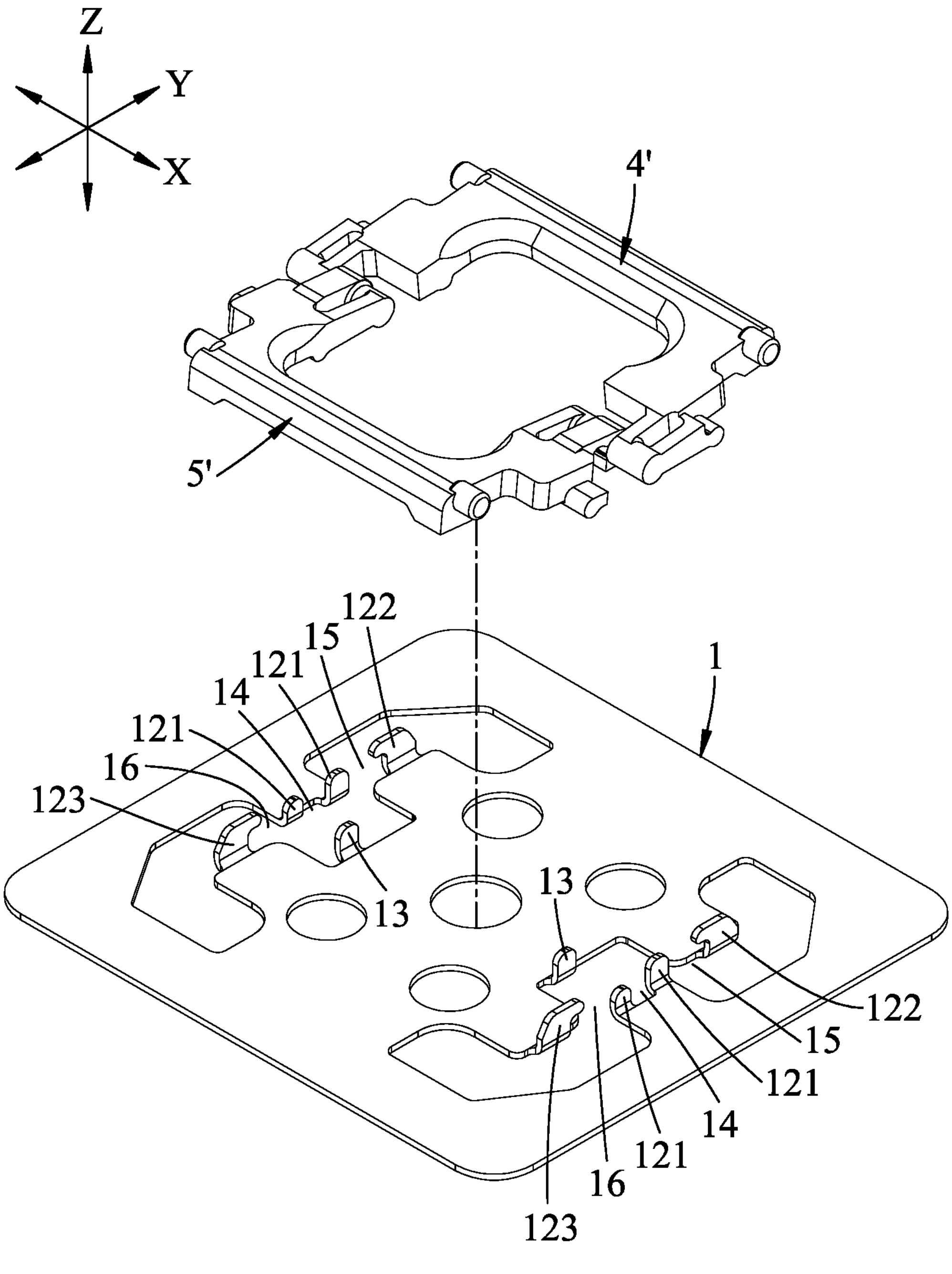
FIG. 8 is an exploded perspective view, illustrating the first frame member assembled to the second frame member, and the base plate of a balanced low travel key switch device according to a second embodiment of the disclosure.
Figure 9:
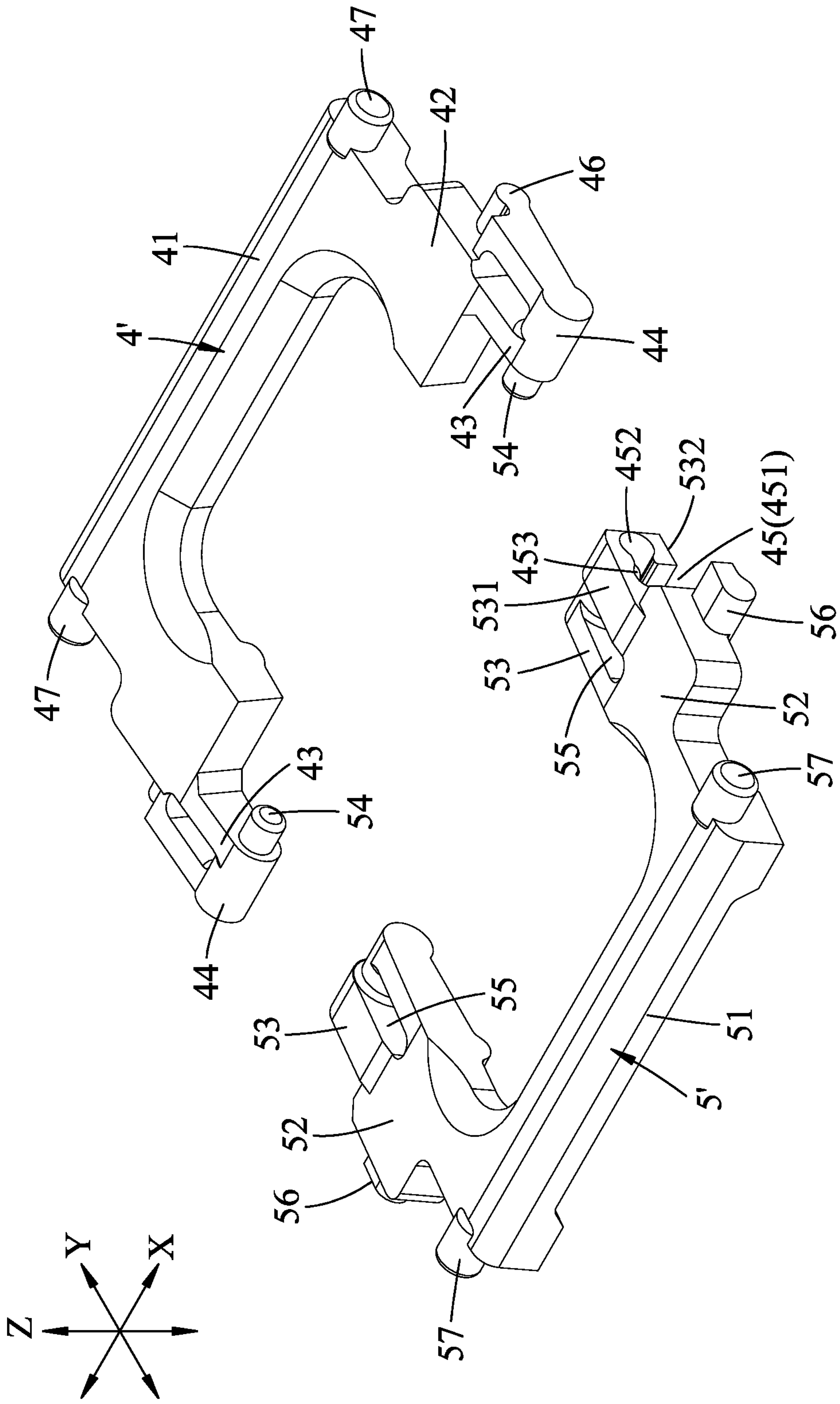
FIG. 9 is an exploded perspective view of the second embodiment illustrating the first frame member and the second frame member in a disassembled state.
Figure 10:
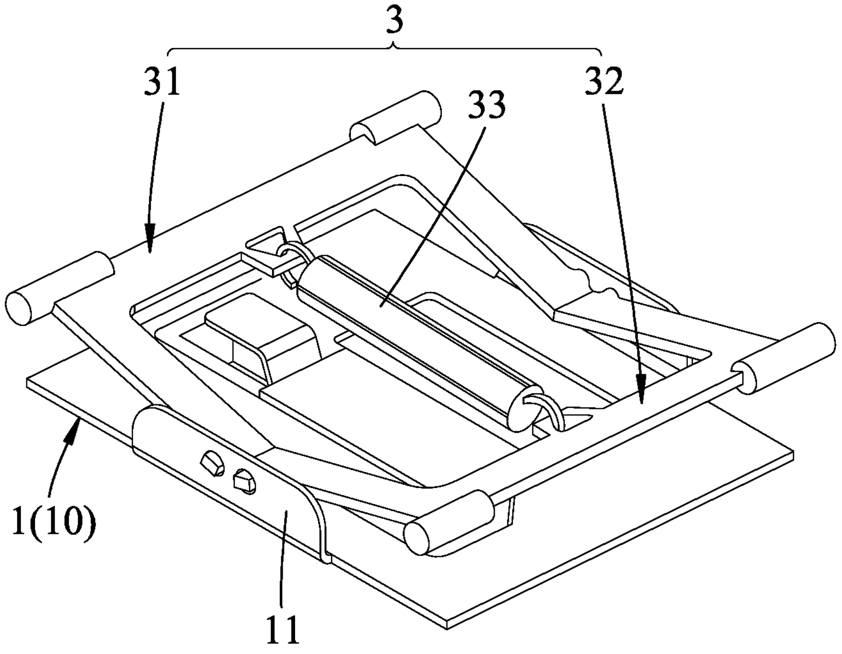
FIG.10 PRIOR ART
FIG. 10 is a perspective view illustrating a first balance frame, a second balance frame, an extension spring, and a base of an existing key switch device in an assembled state.
Figure 11:
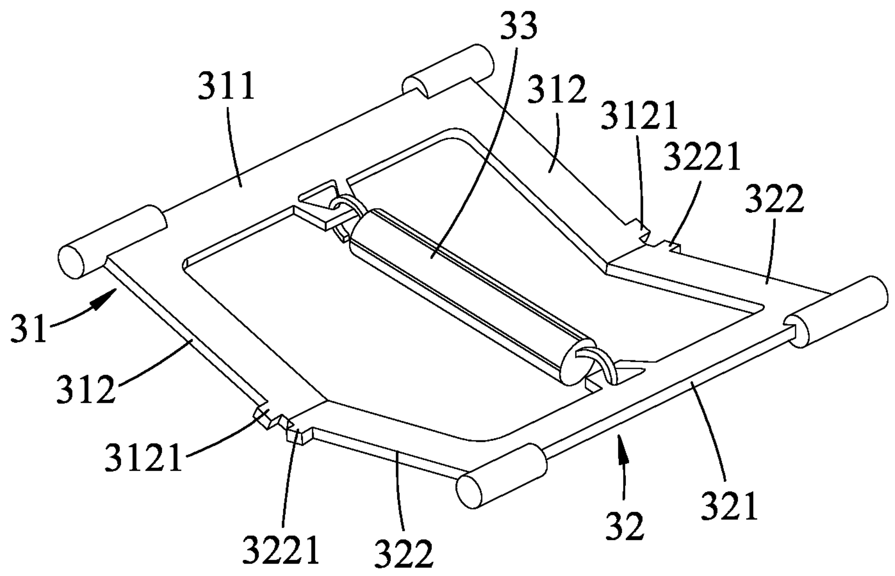
FIG.11 PRIOR ART
FIG. 11 is a perspective view of the existing key switch device illustrating the first balance frame, the extension spring, and the second balance frame in an assembled state.

FIGS. 8 and 9 illustrate the balanced low travel key switch device according to a second embodiment of the disclosure, which has a structure generally similar to that of the first embodiment. However, in this embodiment, the second frame member 5' has the two pivot slots 45, and the first frame member 4' has the two pivot rods 54.

The two pivot slots 45 of the second frame member 5' are respectively formed in the second pivotal portions 53. The open end portion 451 of each of the pivot slots 45 is formed in the bottom surface 532 of the respective one of the second pivot portions 53. The first slot portion 452 of each of the pivot slots 45 is disposed more distantly from a respective one of the second lateral portions 52 that is connected to the respective one of the second pivot portions 53 than the second slot portion 453 of the pivot slot 45.

The pivot rods 54 of the first frame member 4' are respectively disposed on the first pivotal portions 43 and extend respectively opposite to the positioning rods 44. Each of the pivot rods 54 is removably engaged with the first slot portion 452 of a respective one of the pivot slots 45 by passing sequentially through the open end portion 451 and the second slot portion 453 of the pivot slot 45.

Besides the pivot slots 45 and the pivot rods 54, the structure of the balanced low travel key switch device of the second embodiment is generally similar to that of the first embodiment. Therefore, the balanced low travel key switch device of the second embodiment may achieve the same effect as that of the first embodiment.

In summary, because the positioning rods 44 is limited by the constraining portions 121 of the respective mounting seats 12 to move in the limiting recess 14 along the third axial direction (Z) but not along the second axial direction (Y), and because each of the first engaging rods 46 and each of the second engaging rods 56 are respectively limited by the first hook portion 122 and the second hook portion 123 of the respective mounting seat 12 to move respectively in the first sliding recess 15 and the second sliding recess 16 along the second axial direction (Y) but not along the third axial direction (Z), connectivity of the first frame member 4 and the second frame member 5 is enhanced, operational stability of the first frame member 4 and the second frame member 5 is increased, and a stroke distance is reduced when the keycap 2 is pressed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A balanced low travel key switch device, comprising:

a base plate including
- a plate body,
- two mounting seats that are mounted on said plate body and that are spaced apart from each other along a first axial direction, each of said mounting seats having a limiting recess, a first sliding recess, and a second sliding recess that are arranged along a second axial direction perpendicular to the first axial direction, said first sliding recess and said second sliding recess being respectively disposed on two opposite sides of said limiting recess;

a key cap disposed at a side of said base plate along a third axial direction that is perpendicular to the first axial direction and the second axial direction; and a frame unit removably interconnecting said mounting seats and said key cap, and including a first frame member and a second frame member that are arranged along the second axial direction;

wherein said first frame member has
- a first main body that is pivotally connected to said key cap,
- two first lateral portions that are spaced apart from each other along the first axial direction and that are respectively connected to opposite ends of said first main body, two first pivotal portions that are respectively connected to distal ends of said first lateral portions, two first engaging blocks that are respectively disposed on said first lateral portions, that respectively extend into said first sliding recesses of said mounting seats, and that are respectively movable in said first sliding recesses of said mounting seats along the second axial direction, and two positioning rods that are respectively disposed on said first pivotal portions, that respectively extend into said limiting recesses of said mounting seats, and that are respectively movable in said limiting recesses of said mounting seats along the third axial direction; and wherein said second frame member has a second main body that is pivotally connected to said key cap, two second lateral portions that are spaced apart from each other along the first axial direction and that are respectively connected to opposite ends of said second main body, two second pivotal portions that are respectively connected to distal ends of said second lateral portions and that are respectively and pivotally connected to said first pivotal portions, and two second engaging blocks that are respectively disposed on said second lateral portions, that respectively extend into said second sliding recesses of said mounting seats, and that are respectively movable in said second sliding recesses of said mounting seats along the second axial direction;

wherein said balanced low travel key switch device further comprises a membrane circuit board that is disposed between said key cap and said base plate, and a resilient member that is disposed on said membrane circuit board opposite to said base plate and that resiliently abuts against said key cap;

wherein during movement of said key cap relative to said base plate from a non-pressed position to a pressed position, said key cap is moved toward said plate body, and each of said positioning rods is moved along the third axial direction toward said key cap;

wherein a first distance along the second axial direction between an end of each of said first engaging blocks that is opposite to an adjacent one of said positioning rods and an end of a respective one of said second engaging blocks that is opposite to said positioning rod when said key cap is in the non-pressed position is greater than a second distance along the second axial direction between said end of said first engaging block and said end of said second engaging block when said key cap is in the pressed position;

wherein each of said mounting seats has two constraining portions that are connected to said plate body, that are spaced apart from each other along the second axial direction, and that cooperatively define said limiting recess, and a first hook portion and a second hook portion that are spaced apart from each other along the second axial direction, and that are respectively disposed at opposite sides of said constraining portions, said first hook portion and an adjacent one of said constraining portions cooperatively defining said first sliding recess, said second hook portion and an adjacent one of said constraining portions cooperatively defining said second sliding recess;

wherein said limiting recess has an opening that is opposite to said plate body along the third axial direction for removal of the respective one of said positioning rods therethrough; and wherein when said key cap is in the non-pressed position relative to said base plate, each of said first engaging blocks abuts against said first hook portion of the respective one of said mounting seats, and said second engaging blocks abuts against said second hook portion of the respective one of said mounting seats.

2. The balanced low travel key switch device as claimed in claim 1, wherein:

said first frame member further has two pivot slots that are respectively formed in said first pivotal portions;

each of said pivot slots is disposed opposite to a respective one of said positioning rods, and has an open end portion, a first slot portion, and a second slot portion, said second slot portion being bent from said open end portion, said first slot portion extending from said second slot portion and opposite to said open end portion;

said second pivotal portions of said second frame member are disposed between said first pivot portions of said first frame member;

said second frame member further has two pivot rods that are respectively disposed on said second pivot portions; and each of said pivot rods is removably engaged with said first slot portion of a respective one of said pivot slots by passing sequentially through said open end portion and said second slot portion of said pivot slot.

3. The balanced low travel key switch device as claimed in claim 2, wherein:

each of said first pivot portions has a top surface that faces said key cap, and a bottom surface that is opposite to said top surface;

said open end portion of each of said pivot slots is formed in said top surface of a respective one of said first pivot portions; and said first slot portion of each of said pivot slots is disposed more distantly from a respective one of said first lateral portions that is connected to the respective one of said first pivotal portions than said second slot portion of said pivot slot.

4. The balanced low travel key switch device as claimed in claim 1, wherein:

said first frame member further has two pivot rods that are respectively disposed on said first pivotal portions and that extend respectively opposite to said positioning rods;

said second pivotal portions of said second frame member are disposed between said first pivot portions of said first frame member;

said second frame member further has two pivot slots that are respectively formed in said second pivotal portions;

each of said pivot slots has an open end portion, a first slot portion, and a second slot portion, said second slot portion being bent from said open end portion, said first slot portion extending from and being smaller than said second slot portion, and opposite to said open end portion; and each of said pivot rods is removably engaged with said first slot portion of a respective one of said pivot slots by passing sequentially through said open end portion and said second slot portion of said pivot slot.

5. The balanced low travel key switch device as claimed in claim 4, wherein:

each of said second pivotal portions of said second frame member has a top surface that faces said key cap, and a bottom surface that is opposite to said top surface;

said open end portion of each of said pivot slots is formed in said bottom surface of the respective one of said second pivot portions; and said first slot portion of each of said pivot slots is disposed more distantly from a respective one of said second lateral portions that is connected to the respective one of said second pivot portions than said second slot portion of said pivot slot.

6. The balanced low travel key switch device as claimed in claim 1, wherein said first pivot portions of said first frame member and said second pivotal portions of said second frame member are pivotable about an axial line that passes through said positioning rods of said first frame member and that extends along the first axial direction.

7. The balanced low travel key switch device as claimed in claim 1, wherein:

said second frame member further has two channels that extend therethrough; and said base plate further includes two stop members that extend from said plate body and that are disposed between said mounting seats; and said stop members respectively extend into said channels of said second frame member.

8. The balanced low travel key switch device as claimed in claim 1, wherein:

said first frame member further has two first engaging rods that are respectively disposed on two opposite sides of said first main body along the first axial direction and that are pivotally connected to said key cap;

each of said first engaging rods is disposed on an end of said first main body that is opposite to said base plate along the third axial direction;

said second frame member further has two second engaging rods that are respectively disposed on two opposite sides of said second main body along the first axial direction and that are pivotally connected to said key cap; and each of said second engaging rods is disposed on an end of said second main body that is opposite to said base plate along the third axial direction.

9. A balanced low travel key switch device, comprising:

a base plate including a plate body, two mounting seats that are mounted on said plate body and that are spaced apart from each other along a first axial direction, each of said mounting seats having a limiting recess, a first sliding recess, and a second sliding recess that are arranged along a second axial direction perpendicular to the first axial direction, said first sliding recess and said second sliding recess being respectively disposed on two opposite sides of said limiting recess;

a key cap disposed at a side of said base plate along a third axial direction that is perpendicular to the first axial direction and the second axial direction; and a frame unit removably interconnecting said mounting seats and said key cap, and including a first frame member and a second frame member that are arranged along the second axial direction;

wherein said first frame member has a first main body that is pivotally connected to said key cap, two first lateral portions that are spaced apart from each other along the first axial direction and that are respectively connected to opposite ends of said first main body, two first pivotal portions that are respectively connected to distal ends of said first lateral portions, two first engaging blocks that are respectively disposed on said first lateral portions, that respectively extend into said first sliding recesses of said mounting seats, and that are respectively movable in said first sliding recesses of said mounting seats along the second axial direction, and two positioning rods that are respectively disposed on said first pivotal portions, that respectively extend into said limiting recesses of said mounting seats, and that are respectively movable in said limiting recesses of said mounting seats along the third axial direction; and wherein said second frame member has a second main body that is pivotally connected to said key cap, two second lateral portions that are spaced apart from each other along the first axial direction and that are respectively connected to opposite ends of said second main body, two second pivotal portions that are respectively connected to distal ends of said second lateral portions and that are respectively and pivotally connected to said first pivotal portions, and two second engaging blocks that are respectively disposed on said second lateral portions, that respectively extend into said second sliding recesses of said mounting seats, and that are respectively movable in said second sliding recesses of said mounting seats along the second axial direction;

wherein said first frame member further has two pivot slots that are respectively formed in said first pivotal portions;

wherein each of said pivot slots is disposed opposite to a respective one of said positioning rods, and has an open end portion, a first slot portion, and a second slot portion, said second slot portion being bent from said open end portion, said first slot portion extending from said second slot portion and opposite to said open end portion;

wherein said second pivotal portions of said second frame member are disposed between said first pivot portions of said first frame member;

wherein said second frame member further has two pivot rods that are respectively disposed on said second pivot portions; and wherein each of said pivot rods is removably engaged with said first slot portion of a respective one of said pivot slots by passing sequentially through said open end portion and said second slot portion of said pivot slot.

10. The balanced low travel key switch device as claimed in claim 9, wherein:

each of said first pivot portions has a top surface that faces said key cap, and a bottom surface that is opposite to said top surface;

said open end portion of each of said pivot slots is formed in said top surface of a respective one of said first pivot portions; and said first slot portion of each of said pivot slots is disposed more distantly from a respective one of said first lateral portions that is connected to the respective one of said first pivotal portions than said second slot portion of said pivot slot.

11. The balanced low travel key switch device as claimed in claim 9, wherein said first pivot portions of said first frame member and said second pivotal portions of said second frame member are pivotable about an axial line that passes through said positioning rods of said first frame member and that extends along the first axial direction.

12. The balanced low travel key switch device as claimed in claim 9, wherein:

said first frame member further has two first engaging rods that are respectively disposed on two opposite sides of said first main body along the first axial direction and that are pivotally connected to said key cap;

each of said first engaging rods is disposed on an end of said first main body that is opposite to said base plate along the third axial direction;

said second frame member further has two second engaging rods that are respectively disposed on two opposite sides of said second main body along the first axial direction and that are pivotally connected to said key cap; and each of said second engaging rods is disposed on an end of said second main body that is opposite to said base plate along the third axial direction.

13. A balanced low travel key switch device, comprising:

a base plate including a plate body, two mounting seats that are mounted on said plate body and that are spaced apart from each other along a first axial direction, each of said mounting seats having a limiting recess, a first sliding recess, and a second sliding recess that are arranged along a second axial direction perpendicular to the first axial direction, said first sliding recess and said second sliding recess being respectively disposed on two opposite sides of said limiting recess;

a key cap disposed at a side of said base plate along a third axial direction that is perpendicular to the first axial direction and the second axial direction; and a frame unit removably interconnecting said mounting seats and said key cap, and including a first frame member and a second frame member that are arranged along the second axial direction;

wherein said first frame member has a first main body that is pivotally connected to said key cap, two first lateral portions that are spaced apart from each other along the first axial direction and that are respectively connected to opposite ends of said first main body, two first pivotal portions that are respectively connected to distal ends of said first lateral portions, two first engaging blocks that are respectively disposed on said first lateral portions, that respectively extend into said first sliding recesses of said mounting seats, and that are respectively movable in said first sliding recesses of said mounting seats along the second axial direction, and two positioning rods that are respectively disposed on said first pivotal portions, that respectively extend into said limiting recesses of said mounting seats, and that are respectively movable in said limiting recesses of said mounting seats along the third axial direction; and wherein said second frame member has a second main body that is pivotally connected to said key cap, two second lateral portions that are spaced apart from each other along the first axial direction and that are respectively connected to opposite ends of said second main body, two second pivotal portions that are respectively connected to distal ends of said second lateral portions and that are respectively and pivotally connected to said first pivotal portions, and two second engaging blocks that are respectively disposed on said second lateral portions, that respectively extend into said second sliding recesses of said mounting seats, and that are respectively movable in said second sliding recesses of said mounting seats along the second axial direction;

wherein said second frame member further has two channels that extend therethrough;

wherein said base plate further includes two stop members that extend from said plate body and that are disposed between said mounting seats; and wherein said stop members respectively extend into said channels of said second frame member.

14. The balanced low travel key switch device as claimed in claim 13, wherein:

said first frame member further has two pivot slots that are respectively formed in said first pivotal portions;

each of said pivot slots is disposed opposite to a respective one of said positioning rods, and has an open end portion, a first slot portion, and a second slot portion, said second slot portion being bent from said open end portion, said first slot portion extending from said second slot portion and opposite to said open end portion;

said second pivotal portions of said second frame member are disposed between said first pivot portions of said first frame member;

said second frame member further has two pivot rods that are respectively disposed on said second pivot portions; and each of said pivot rods is removably engaged with said first slot portion of a respective one of said pivot slots by passing sequentially through said open end portion and said second slot portion of said pivot slot.

15. The balanced low travel key switch device as claimed in claim 14, wherein:

each of said first pivot portions has a top surface that faces said key cap, and a bottom surface that is opposite to said top surface;

said open end portion of each of said pivot slots is formed in said top surface of a respective one of said first pivot portions; and said first slot portion of each of said pivot slots is disposed more distantly from a respective one of said first lateral portions that is connected to the respective one of said first pivotal portions than said second slot portion of said pivot slot.

16. The balanced low travel key switch device as claimed in claim 13, wherein:

said first frame member further has two pivot rods that are respectively disposed on said first pivotal portions and that extend respectively opposite to said positioning rods;

said second pivotal portions of said second frame member are disposed between said first pivot portions of said first frame member;

said second frame member further has two pivot slots that are respectively formed in said second pivotal portions;

each of said pivot slots has an open end portion, a first slot portion, and a second slot portion, said second slot portion being bent from said open end portion, said first slot portion extending from and being smaller than said second slot portion, and opposite to said open end portion; and each of said pivot rods is removably engaged with said first slot portion of a respective one of said pivot slots by passing sequentially through said open end portion and said second slot portion of said pivot slot.

17. The balanced low travel key switch device as claimed in claim 16, wherein:

each of said second pivotal portions of said second frame member has a top surface that faces said key cap, and a bottom surface that is opposite to said top surface;

said open end portion of each of said pivot slots is formed in said bottom surface of the respective one of said second pivot portions; and said first slot portion of each of said pivot slots is disposed more distantly from a respective one of said second lateral portions that is connected to the respective one of said second pivot portions than said second slot portion of said pivot slot.

18. The balanced low travel key switch device as claimed in claim 13, wherein said first pivot portions of said first frame member and said second pivotal portions of said second frame member are pivotable about an axial line that passes through said positioning rods of said first frame member and that extends along the first axial direction.

19. The balanced low travel key switch device as claimed in claim 13, wherein:

said first frame member further has two first engaging rods that are respectively disposed on two opposite sides of said first main body along the first axial direction and that are pivotally connected to said key cap;

each of said first engaging rods is disposed on an end of said first main body that is opposite to said base plate along the third axial direction;

said second frame member further has two second engaging rods that are respectively disposed on two opposite sides of said second main body along the first axial direction and that are pivotally connected to said key cap; and each of said second engaging rods is disposed on an end of said second main body that is opposite to said base plate along the third axial direction.

* * * * *